United States Patent [19]

Leblanc et al.

[11] Patent Number: 4,975,483

[45] Date of Patent: Dec. 4, 1990

[54] PROCESS FOR TREATING AN AQUEOUS SOLUTION OF ACRYLAMIDE RESIN IN ORDER TO ENABLE IT TO GEL SLOWLY EVEN AT HIGH TEMPERATURE

[75] Inventors: Marie-Christine P. Leblanc, Saint Cloud; Josiane A. Durrieu, Chatou; Jean-Pierre P. Binon, Saint Raphael; Gerard G. Provin, Ezanville; Jean-Jacques Fery, Bar le Duc, all of France

[73] Assignees: Total Compagnie Francaise des Petroles, Paris; Etablissements VASSET, Ezanville, both of France

[21] Appl. No.: 111,333

[22] Filed: Oct. 22, 1987

[30] Foreign Application Priority Data

Oct. 22, 1986 [FR] France .................................. 14640/86

[51] Int. Cl.$^5$ .............................................. C08L 39/00
[52] U.S. Cl. ...................... 524/555; 524/723; 524/753; 524/827; 526/303.1; 526/304
[58] Field of Search ............... 524/555, 827, 723, 753; 526/303.1, 304

[56] References Cited

U.S. PATENT DOCUMENTS

| | | | |
|---|---|---|---|
| 2,831,841 | 4/1958 | Jones .................................. | 526/287 X |
| 3,247,171 | 4/1966 | Walker et al. .................... | 526/287 X |
| 3,288,740 | 11/1966 | Maeder et al. ...................... | 524/827 |
| 4,172,066 | 10/1979 | Zweigle et al. .................. | 526/306 X |
| 4,536,326 | 8/1985 | Schmitt .......................... | 526/303.1 X |
| 4,585,812 | 4/1986 | Field ............................... | 524/555 X |
| 4,622,356 | 11/1986 | Jarovitzky et al. ............. | 524/555 X |
| 4,696,962 | 9/1987 | Danner et al. ................... | 524/555 X |
| 4,737,386 | 4/1988 | Wotier et la. .................... | 524/555 X |

Primary Examiner—Joseph L. Schofer
Assistant Examiner—J. M. Reddick
Attorney, Agent, or Firm—Sughrue, Mion, Zinn, Macpeak & Seas

[57] ABSTRACT

Process for treating an aqueous solution of acrylamide resin, characterized in that an emulsifier which is preferably nonionic or anionic, a solution of initiator comprising an organic peroxide, preferably a diperoxide, and optionally a solution of a retarder preferably consisting of a phenol derivative or an alkali metal inorganic derivative are added slowly and with stirring, preferably in the form of a pre-emulsion, to an aqueous solution of acrylamide resin monomer.

12 Claims, No Drawings

PROCESS FOR TREATING AN AQUEOUS SOLUTION OF ACRYLAMIDE RESIN IN ORDER TO ENABLE IT TO GEL SLOWLY EVEN AT HIGH TEMPERATURE

The present invention relates to the gelation by polymerization, at temperatures above normal ambient temperatures, of acrylamide monomers, in particular, in the petroleum industry, for the consolidation of soils, for example the permanent plugging of leakage zones or of reservoirs that produce undesirable fluids, irrespective of whether these leaks originate from the permeability of the soil, from fissures or from fractures, for the injection into the soil of products providing for the sealing of underground natural reservoirs, and for the consolidation of sands capable, in particular, of withstanding pressures of 350 bars.

Hitherto, for the gelation of acrylamide monomers, catalytic systems based on inorganic peroxides have been used, and these have the disadvantage of not permitting gelation times of greater than one hour for temperatures of more than 60° C.

The investigations which led to the present invention were performed for the purpose of finding a catalytic system enabling gelation times of an acrylamide monomer of greater than one hour to be obtained even at high temperatures, exceeding 60° C.

It was found, surprisingly, that this result could be obtained by treating the acrylamide resin according to a special procedure using a polymerization initiator as well as an emulsifier and optionally a retarder, which compounds can advantageously be chosen so as to be well suited to the desired result.

The subject of the present invention is thus a process for treating an aqueous solution of acrylamide monomer, characterized in that at least one emulsifier and one initiator comprising an organic peroxide are added slowly and with stirring to an aqueous solution of acrylic mide monomer.

Optionally, it is also possible to add a retarder The emulsifier, the initiator and the optional retarder are preferably added in the form of a pre-emulsion. The pre-emulsion is advantageously homogenized before being emulsified in a solution of monomer.

The emulsifier is preferably nonionic and consists advantageously of a polyoxyethylenated sorbitan ester, or anionic and consists advantageously of a sulphated fatty amide.

The retarder is preferably a phenolic derivative such as a para-tert-butylcatechol or a hydroquinone, an alkali metal inorganic derivative such as a disodium phosphate, a potassium ferricyanide or an alkali metal carbonate.

The organic peroxide is preferably a diperoxide, such as a 2,2-bis(tert-butylperoxy)butane, or a tert-butyl 2-ethylperhexanoate.

The acrylamide monomer used is preferably an N-methylolacrylamide monomer or a methylolmethacrylamide monomer.

The aqueous solution of acrylamide monomer is preferably subjected to a prior compaction and/or viscosity enhancement treatment.

Examples of implementation of the process according to the present invention are given below without implied limitation.

EXAMPLE 1

A commercial aqueous solution of acrylamide monomer, brought down to a concentration of 15% of active substance for this application, was treated.

A pre-emulsion of the catalytic system was prepared by mixing in succession with stirring: the emulsifier, the retarder and the initiator. For treating 1,000 g of solution of acrylamide monomer containing 15% of active substance, the following were used: as emulsifier, 2 g of polyoxyethylenated sorbitan ester (HLB=16.7), as retarder, 2 g of a 10% strength solution of para-tert-butylcatechol in a phthalate, and as initiator, 2 g of 50% strength solution of 2,2-bis(tert-butylperoxy)butane in an aliphatic hydrocarbon.

This pre-emulsion was introduced into the solution of monomer containing 15% of active substance with slow stirring (the temperature varied from 20° C. to 50° C. and the stirring time from 1 hour to 24 hours). A sample of the mixture thereby formed was then withdrawn and taken to an unstirred hermetically sealed glass reactor placed in an oil bath which was itself maintained at a precision-regulated static temperature. A thermocouple immersed in the reactor and connected to a recorder enabled the temperature variations of the mixture to be measured accurately during the test.

The gelation of a monomer is reflected in a sudden change in temperature observed on the recorder. The gel time of a monomer at a given temperature is determined by observing the time which elapses between the instant at which a solution of this monomer is brought to and maintained at this temperature in a water bath and the beginning of the exothermic gelation reaction.

In the tests performed on the solution of acrylamide monomer prepared as described above, there were observed, at a static temperature of 65° C., an initiation of setting after 480 minutes and a completion of setting after 580 minutes, the gel obtained being elastic, strong and only slightly tacky in appearance, and at a static temperature of 90° C., an initiation of setting after 100 minutes and a completion of setting after 150 minutes, the gel obtained being elastic, strong and tacky in appearance.

Various tests were performed in the presence of contaminants.

Thus, in the presence of iron and iron oxide, there were observed, at a static temperature of 90° C., an initiation of setting after 68 minutes and a completion of setting after 108 minutes, the gel obtained being elastic, strong and tacky in appearance. When air was introduced by stirring, there were observed, at a static temperature of 65° C., an initiation of setting after 235 minutes and a completion of setting after 295 minutes, the gel obtained being elastic, strong and non-tacky in appearance, and at a static temperature of 90° C., an initiation of setting after 40 minutes and a completion of setting after 80 minutes, the gel obtained being elastic, strong and non-tacky in appearance. In the presence of crude petroleum, in a proportion of 1% with respect to the solution of monomers there were observed, at a static temperature of 90° C., an initiation of setting after 100 minutes and a completion of setting after 180 minutes, the gel obtained being elastic, strong and only slightly tacky in appearance; at the same static temperature, with a proportion of 4% of crude petroleum, the gel obtained is similar in appearance but the initiation of setting was observed after 300 minutes and the completion of setting after 370 minutes.

Using 20% of sea water for the water employed for the solution, there were observed, at a static temperature of 90° C., an initiation of setting after 180 minutes and a completion of setting after 200 minutes, the gel obtained being elastic, strong and non-tacky in appearance; using 60% of sea water, there were observed, at a static temperature of 90° C., an initiation of setting after 170 minutes and a completion of setting after 200 minutes, the gel obtained being elastic, strong and only slightly tacky in appearance.

Adding 0.03% by weight of 15% strength hydrochloric acid to the solution, there were observed, at a static temperature of 90° C., an initiation of setting after 35 minutes and a completion of setting after 60 minutes, the gel obtained being brittle, of low strength and non-tacky in appearance, and at a static temperature of 60° C., an initiation of setting after 6 hours and a completion of setting after 7 and a half hours, the gel obtained being brittle, of low strength and non-tacky in appearance.

Tests were carried out adding various inorganic salts to the solution. With 5.86 g of magnesium chloride per liter of solution, there were observed, at a static temperature of 90° C., an initiation of setting after 200 minutes and a completion of setting after 300 minutes, the gel obtained being elastic, strong and non-tacky in appearance. With 6.84 g/L of calcium chloride, there was observed, at a static temperature of 90° C., an initiation of setting after 280 minutes, the gel obtained being elastic, strong and non-tacky in appearance. With 7.22 g/L of sodium chloride, there were observed, at a static temperature of 90° C., an initiation of setting at 140 minutes and a completion of setting at 190 minutes, the gel obtained being elastic, strong and non-tacky in appearance. With 1.16 g/l of magnesium chloride, 1.2 gel of calcium chloride and 4.51 g/l of sodium chloride, there were observed, at a static temperature of 90° C., an initiation of setting after 190 minutes and a completion of setting after 250 minutes, the gel obtained being elastic, strong and non-tacky in appearance With 50 mg/l of calcium carbonate, there were observed, at a static temperature of 90° C., an initiation of setting after 65 minutes and a completion of setting after 75 minutes, the gel obtained being elastic, strong and non-tacky in appearance.

EXAMPLE 2

A 15% strength aqueous solution of acrylamide monomer as in Example 1 was treated according to the same procedure while varying, respectively, the amounts of one of the constituents of the catalytic system, i.e. emulsifier, retarder and initiator, these constituents being the same as in Example 1 and the amounts of the two constituents other than that whose quantity is varied being those of Example 1. For 1,000 g of monomer solution, it was found that, with 1.6, 1.8 and 2 g of emulsifier, respectively, the same setting times were obtained, namely 9 h 40 min at a static temperature of 60° C. and 2 h 30 min at a static temperature of 90° C. With concentrations of retarder, for 1,000 g of monomer solution, of 1.6, 1.8, 2, 2.2, 2.4, 3 and 3.5 g, respectively, setting times of 9 h 30 min, 9 h 30 min, 9 h 40 min, 11 h 40 min, 12 h 30 min and 24 h were obtained at a static temperature of 60° C. and 2 h 30 min, 2 h 30 min, 2 h 30 min, 2 h 40 min, 2 h 40 min, 3 h and 4 h 30 min at a static temperature of 90° C. With concentrations of initiator of 1, 1.5, 2, 2.5 and 3 g for 1,000 g of monomer solution, setting times of 16 h 10 min, 13 h 30 min, 9 h 40 min, 13 h 50 min and 13 h 50 min, respectively, were obtained at a static temperature of 60° C. and 2 h 50 min, 2 h 40 min, 2 h 30 min, 1 h 30 min and 1 h 30 min, respectively, at a static temperature of 90° C.

The process which has just been described is especially advantageous in the petroleum industry, for example for the applications for consolidation of soils mentioned at the beginning of this description. However, it may also be used in many other fields of application, such as, for example, in the wood industry for preparing a fungicidal and anti-termite agent, in the recovery of solar energy for reducing thermal losses, and in public works for performing sealing operations.

We claim:

1. A process for treating an aqueous solution of acrylamide monomer to enable it to gel slowly even at elevated temperature, comprising the step of adding slowly and with stirring at least one emulsifier and one solution of initiator comprising an organic peroxide to an aqueous solution of the acrylamide monomer, wherein the pre-emulsion is emulsified in the aqueous solution of the monomer.

2. Process according to claim 1, wherein the emulsifier is non-ionic and comprises a polyoxyethylenated sorbitan ester.

3. Process according to claim 1, wherein the emulsifier is anionic and comprises a sulphated fatty amide.

4. Process according to claim 1, wherein the said pre-emulsion also comprises a retarder selected from the group consisting of a para-tert-butyl-catechol and hydroquinone.

5. Process according to claim 1, wherein the said pre-emulsion also comprises a retarder selected from the group consisting of a disodium phosphate, a potassium ferricyanide and an alkali metal carbonate.

6. Process according to claim 1, wherein the organic peroxide is 2,2-bis(tert-butylperosy)butane.

7. Process according to claim 1, wherein the acrylamide monomer is selected from the group consisting of an N-methylolacrylamide monomer and a methlyolmethacrylamide monomer.

8. Process according to claim 1, comprising the additional prior step of subjecting the aqueous solution of acrylamide monomer to compacting.

9. Process according to claim 1, comprising the additional prior step of subjecting the aqueous solution of acrylamide monomer to viscosity enhancement.

10. A process according to claim 1, wherein the organic peroxide is tert-butyl 2-ethylhexanoate peroxide.

11. A process according to claim 1 where the gelling of the aqueous solution of acrylamide monomer takes greater than one hour.

12. A process according to claim 11 wherein the gelling is at a temperature exceeding 60° C.

* * * * *